United States Patent [19]
Dahlin et al.

[11] 3,828,190
[45] Aug. 6, 1974

[54] DETECTOR ASSEMBLY

[75] Inventors: Erik B. Dahlin, Saratoga; Robert C. Hill, Santa Clara, both of Calif.

[73] Assignee: Measurex Corporation, Santa Clara, Calif.

[22] Filed: Sept. 23, 1971

[21] Appl. No.: 183,263

Related U.S. Application Data

[63] Continuation of Ser. No. 791,915, Jan. 17, 1969, abandoned.

[52] U.S. Cl. .................. 250/308, 250/359, 250/505
[51] Int. Cl. ............................................. G01t 1/20
[58] Field of Search .......... 250/71.5, 3, 105, 83.30, 250/71.5 R, 308, 359

[56] References Cited
UNITED STATES PATENTS

| | | | |
|---|---|---|---|
| 2,711,480 | 6/1955 | Friedman | 250/105 X |
| 3,011,057 | 11/1961 | Anger | 250/71.5 R |
| 3,210,545 | 10/1965 | Barnett | 250/83.3 D |

Primary Examiner—James W. Lawrence
Assistant Examiner—Davis L. Willis
Attorney, Agent, or Firm—Flehr, Hohbach, Test, Albritton & Herbert

[57] ABSTRACT

Detector assembly for detecting radiation which has been directed at a sheet of material which has a honeycomb structure for collimating the radiation to thereby minimize sensitivity of the detector assembly to the position of the sheet relative to the detector assembly.

4 Claims, 3 Drawing Figures

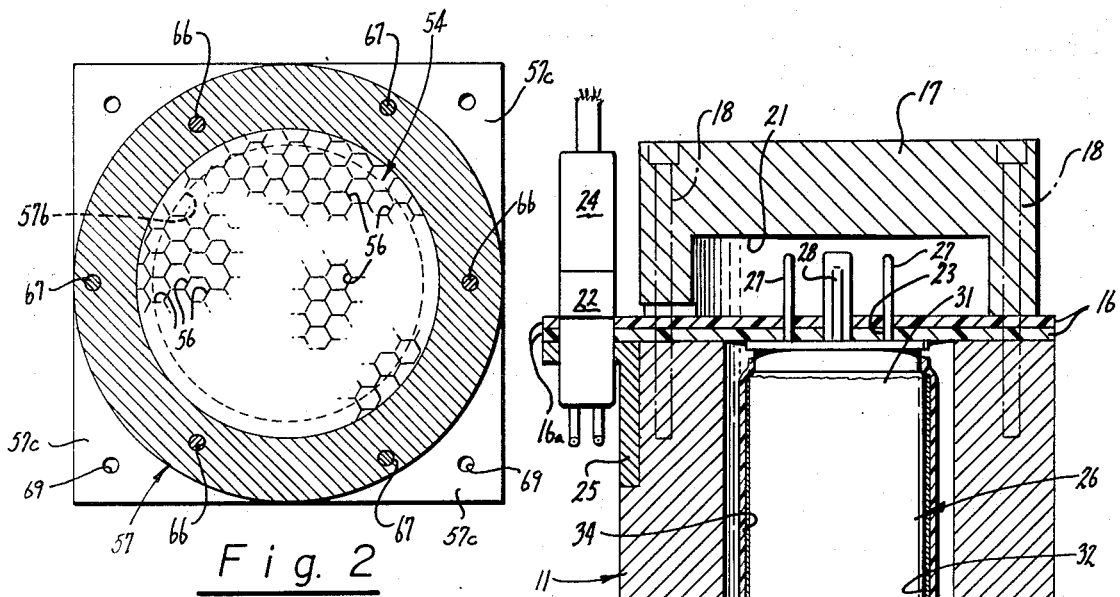
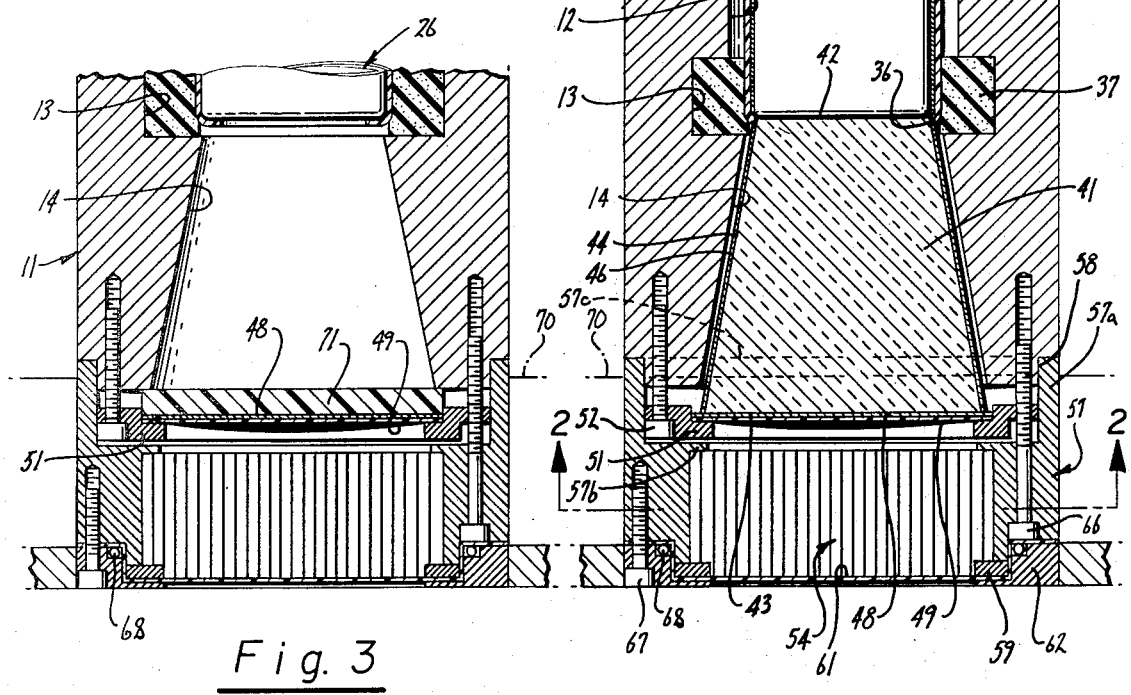
Fig. 2
Fig. 3
Fig. 1
INVENTORS
Erik B. Dahlin
Robert C. Hill
BY
Flehr, Hohbach, Test,
Albritton & Herbert
Attorney

DETECTOR ASSEMBLY

This is a continuation of application Ser. No. 791,915 filed Jan. 17, 1969 now abandoned.

BACKGROUND OF THE INVENTION

Beta particle, X-ray and infra-red radiation detectors are frequently used for the purpose of measuring properties of sheet materials. In such applications, the radiation detector is placed on one side of the sheet and a radiation source is placed on the other side of the sheet directing radiation through the sheet and towards the radiation detector. The sheet may or may not be moving during the measurement. Typically, a beta ray radiation detector is utilized for measuring the mass per unit area of the sheet. The X-ray detector typically has the same application but is used for heavier material, such as thin steel. The infra-red detector is typically used for measurement of moisture content as, for example, of a pair sheet. In making such measurements, it is often very desirable to have the sheet not make contact with either detector or the source in order to avoid marking of the surfaces of the sheet. In such situations, it is very difficult to maintain the sheet in a fixed position with respect to the detector. Certain prior art measuring techniques cannot tolerate any substantial variation in the location of the sheet with respect to the detector or the source with respect to the detector without a substantial loss of calibration. In the making of such measurements, it is desirable for the detector to collect as much of the radiation as possible in order to minimize the size of the source and also to minimize the effects of sheet flutter and mechanical dimension shifts between the source and the detector. Unfocused radiation from the source is subject to inverse square law distance attenuation and scattering from the sheet of paper or other material being measured. The combination of these effects is to make the measurement of small areas of the sheet difficult, which also makes it very difficult to examine the fine structure in the sheet. There is, therefore, a need for a new and improved detector assembly.

SUMMARY OF THE INVENTION AND OBJECTS

The detector assembly is provided for receiving radiation after it has been directed at a sheet of material to determine a characteristic of the sheet of material. The detector assembly consists of the grid-like structure which is provided with a plurality of openings having their axes extending generally in the direction of the line of radiation so that the grid-like structure rejects scattered radiation. Means is provided for converting the radiation to another type of energy and means is provided for receiving said other type of energy and providing on output signal.

In general, it is an object of the present invention to provide a detector assembly in which means is provided for rejecting scattered radiation.

Another object of the invention is to provide a detector assembly of the above character which is relatively insensitive to sheet flutter.

Another object of the invention is to provide a detector assembly which is particularly useful for detecting beta particles.

Another object of the invention is to provide a detector assembly of the above character which can be utilized in relatively harsh environments.

Another object of the invention is to provide a detector assembly of the above character which provides negligible attenuation to the beta particles received.

Additional objects and features of the invention will appear from the following description in which the preferred embodiments are set forth in detail in conjunction with the accompanying drawing.

BRIEF DESCRIPTION OF THE DRAWING

FIG. 1 is a cross-sectional view of the detector assembly incorporating the present invention.

FIG. 2 is a cross-sectional view taken along the line 2—2 of FIG. 1.

FIG. 3 is a partial cross-sectional view of another embodiment of a detector assembly incorporating the present invention.

DESCRIPTION OF PREFERRED EMBODIMENTS

The detector assembly shown in FIGS. 1 and 2 consists of a housing or body 11 formed of a suitable material such as steel. The body 11 is substantially cylindrical as shown. The body or housing is provided with a cylindrical bore 12 which opens into a larger annular recess 13. The recess 13 opens into truncated cone-shaped passage 14.

A printed circuit board 16 is mounted on one end of the housing 11 and extends across the bore 12. The printed circuit board is generally circular and is provided with an extension 16a. The printed circuit board is held in place by a cover 17 which overlies the printed circuit board 16. The cover 17 is held in place by cap screws 18 which extend through the cover, through the printed circuit board 16 and are threaded into the housing 11. The cover 17 is provided with a cylindrical recess 21 which is in axial alignment with the bore 12 provided in the housing 11. A connector 22 of a conventional type is mounted on the extension 16a of the printed circuit board and is connected by printed circuitry (not shown) on the board to a plurality of plated-through holes 23. Another connector 24 is mounted upon the connector 22 and is adapted to be connected to a suitable source of power and to signal amplifying means. A bracket 25 is mounted on the housing 11 and supports the extension 16a of the board 16.

A photomultiplier tube 26 of a conventional type is mounted within the bore 12 and has its pins 27 extending through the holes 23 to make contact with the connector 22 carried by the printed circuit board 16. The photomultiplier tube 26 is provided with a center plug 28 for alignment purposes. The printed circuit board 16 has been utilized for the photomultiplier tube in order to keep all leads as short as possible to thereby minimize lead inductance.

To prevent a charge build-up on the outside wall of the photomultiplier tube, the outside wall of the photomultiplier tube is coated with "Aquadag" or other similar conductive black paint. This layer of black paint is shown as layer 31 in FIG. 1. The photomultiplier tube is then covered with a conductive metal layer 32 of a suitable material such as copper tape. Thereafter, a tube 34 of heat-shrinkable plastic is provided on the photomultiplier tube and is shrunk in place by the application of heat. It will be noted from FIG. 1 that the side walls only of the photomultiplier are covered in this manner and opening 36 is provided at the upper end of the photomultiplier tube. It also will be noted that there is a space between the photomultiplier tube and the wall forming the bore 12 to minimize capacitive coupling between cathode shield and earth ground. The upper extremity of the photomultiplier tube 26 is supported by a gasket 37 seated within the recess 13 and formed of a suitable material such as rubber.

A truncated conical light pipe 41 is mounted within the passage 14 and is provided with spaced parallel planar ends 42 and 43, with end 42 being smaller than end 43 and a sloping side wall 44 of the light pipe 41 is mounted so that the smaller end faces the photomultiplier tube and is bonded thereto by a suitable transparent adhesive. The light pipe 41 is formed of a transparent material and preferably is formed of quartz. Quartz is desirable because it serves to stop certain radiation as, for example, beta particles, from entering the photomultiplier tube and the following electronics. The use of quartz is also desirable because it does not darken when utilized with radiation such as beta particles. The sloping side wall 44 is covered with a suitable reflecting material such as the layer 46 of aluminum. When aluminum is used, it can be protected with a further layer of silicon monoxide.

A scintillator member 48 formed of a suitable material is secured directly to the larger planar surface 43 of the light pipe 41 by a suitable transparent bonding material. Undesirable external light is prevented from entering the phototube by a member 49 formed of a very thin foil of a suitable opaque material having low mass per unit area, such as aluminized plastic. Alternatively, if desired, the scintillator member 48 may be aluminized. This is advantageous because it further reduces the mass that the beta particles have to traverse to reach the scintillator. This member 49 is clamped into place against the scintillator member 48 by a clamping ring 51 formed of a suitable material, such as Nylon, which is secured to the housing 11 by cap screws 52.

Means is provided for collimating the radiation which is received by the scintillator member 48 and consists of a grid-like structure 54 in the form of a honeycomb having typically hexagonally-shaped openings 56 with axes parallel to the axis of the light pipe 41. The structure 54 is mounted within a cap 57. The cap 57 is provided with a downwardly depending flange portion 57a which seats in an annular recess 58 provided in the housing 11. The cap 57 is also provided with an inwardly extending flange portion 57b against which the grid-like structure 54 seats. The cap 57 is also provided with an outwardly extending flange portion 57c which is used for a purpose hereinafter described. The grid-like structure 54 is held in place by a ring 59 of a suitable material, such as Nylon. A sheet 61 of a suitable material, such as a plastic film which has been provided with a coating of aluminum that has been vapor deposited, is mounted over the grid-like structure 54 and is held in place by a clamping ring 62. The cap 57 is held in place by cap screws 66. The ring 62 is secured to the cap 57 by screws 67. A seal is formed between the cap 57 and the ring 62 by an O-ring 68.

The flange portions 57c are provided with holes 69 which can receive screws (not shown) for clamping the detector assembly to a base plate 70.

The sheet 61 is positioned so that the aluminized surface faces inwardly to avoid damage from abrasion. The sheet 61 is opaque and provides double insurance that ambient exterior light does not enter the light pipe 41.

The aluminized plastic film was selected for the windows because of its high mechanical strength, i.e., particularly its high tensile strength and high burst strength. In addition, it has tolerance for high temperatures and has a vastly superior resistance to radiation in comparison to other plastics. The opaque windows, in addition to keeping light out of the detector assembly, serves to keep out dust, corrosion fumes and the like. They also provide negligible attenuation of beta particles.

The geometry of the grid-like structure 54 is particularly important so as to provide a low radiation resistance over a narrow acceptance angle and a high radiation resistance at other incidence angles. The principal objective is to prevent the reception of radiation which has high angles of incidence. It has been found that when a honeycomb structure of proper geometry forms a part of the detector assembly, only radiation which is substantially parallel to the Z-axis or parallel to the axes of the openings 56 will be detected. It has been found that this radiation is not sensitive to sheet location. The material which is utilized for the grid-like structure should be formed of material having a density sufficiently high so that thin foils (1 to 5 mils) of the material are capable of stopping or appreciably attenuating beta particles. One such material which is suitable is steel. It has been found that it is desirable that the honeycomb structure have a thickness of approximately 7 times the diameter of the openings, with a maximum permissible ratio of 10 to 1 and minimum of 5 to 1 for the configuration of the radiation detector described herein. Other thickness to hole diameter ratios may prove optimum with other combinations of source-detector geometry.

It is generally desirable with the configuration described that all radiation having an angle of incidence greater than 8.5° be prevented from entering the light pipe. However, radiation ranging from an angle of 6° to 11° with respect to the Z-axis can be tolerated. By way of example, one grid-like structure 56 found to be suitable for use with detection of beta rays was formed of stainless steel having a thickness of approximately 0.002 of an inch. The openings 56 had diameters of approximately one-eighth of an inch and the grid-like structure had a depth of approximately seven-eighths of an inch with an overall outside diameter of approximately 2 inches. It was found that this grid-like structure served to reject all beta particles whose angle departed from the Z-axis of the grid-like structure by more than one part in seven.

Operation and use of the detector assembly may now be briefly described as follows. Let it be assumed that the detector assembly has been mounted in sheet gauging apparatus of the type described in copending application Ser. No. 792,007, filed Jan. 17, 1969, now U.S. Pat. No. 3,621,259 issued Nov. 11, 1971 and that it is being utilized for making basis weight measurements for sheets of paper. Let it also be assumed that the source of radiation is of the type described in copending application Ser. No. 792,088, filed Jan. 17, 1969, now U.S. Pat. No. 3,697,755 issued Oct. 10, 1972 and that beta particles are emitted from the source. Let it also be assumed that the source and the detector assembly are positioned so that the sheet of material being examined passes between the source and the detector so that the radiation is directed through the sheet of paper and is received by the detector assembly. Any radiation which leaves the sheet at an angle which is greater than a predetermined angle will be substantially attenuated by the grid-like structure 54 and practically none of the radiation will strike the scintillator member 48. However, substantially all the radiation within a predetermined angle will readily pass through the openings 56 in the grid-like structure 54 and will impinge upon the scintillator member 48 to cause the emission of fast light pulses which travel through the light pipe 41 and enter the photomultiplier tube 26 which converts the light pulses to electrical signals and amplifies them where they are supplied through the connector 24 to appropriate electronic circuitry.

It can be seen that the grid-like structure 54, the scintillator member 48, the light pipe 41 and the photomultiplier tube 26 are all in axial alignment so that a relatively compact assembly is provided. The two layers of aluminized Kapton, namely layers 49 and 61, or the single layer 61 and the aluminized scintillator member 48 when the scintillator member is aluminized serve to ensure that no light from the exterior enters the light pipe 41 so that all light which travels through the light pipe 41 is created by the scintillator member 48. The outer covering for the photomultiplier tube 26 also serves to prevent any light other than that created by the scintillator member 48 from entering the photomultiplier tube. The coating for the photomultiplier tube also prevents a potential from building up on the outer wall of the tube which could possibly de-focus the cathode of the photomultiplier tube.

The principal purpose of the steel casing 11 is to shield personnel and the electronics from any possible gamma radiation from the radioactive source and Bremmstrahlung originating from the attenuation of the beta particles by the light pipe 41 and the scintillator member 48.

Another embodiment of a detector assembly incorporating the present invention is shown in FIG. 3. It is substantially identical to that shown in FIG. 1 with the exception that in place of the light pipe 41, an air space is provided within the passage 14 and the wall surface which forms the passage 14 is highly polished. This highly polished surface performs the same function as the aluminized layer 46 provided on the light pipe at a lesser expense. Alternatively, a glass or plastic funnel with a highly reflecting inner surface can be mounted in the casing 11 to perform the same function. In view of the fact that the light pipe 41 has been omitted, a transparent substrate 71, such as one formed of quartz, is mounted over the larger end of the passage 14. The scintillator member 48 is then bonded to the exterior surface of the substrate 71 and this is covered by aluminized plastic layer 49. These are held in place by the ring 51. The remainder of the construction is identical to that hereinbefore described in conjunction with FIGS. 1 and 2. The operation and use of this embodiment of the invention is identical to that hereinbefore described in conjunction with FIGS. 1 and 2. The purposes of the substrate 71 are to provide a support for the scintillator member 48 and to prevent beta particles which have penetrated the thin scintillator member 48 from reaching the phototube 26. The light pulses which are created when radiation energy strikes the scintillator member 48 are transmitted through the air to the photomultiplier tube 26.

In both of the embodiments, it can be seen that the conical element which takes the form of a conical reflecting surface serves to provide an area transformation enabling the use of a selected photomultiplier tube to be coupled to a scintillator of the required size. In both embodiments, the grid-like structure 56 serves to limit the angular field of view of the detector assembly and thereby greatly reduces the sensitivity of the detector assembly to sheet flutter. With such an arrangement, it has been found that it is possible to separate the source and the detector assembly by over one-half an inch and that the measurements which are made are not appreciably affected by movement or fluttering of the sheet within this ½ inch. By way of example, it has been found that sheet flutter within this one-half inch does not change any counts of the events detected by the photomultiplier tube by more than 0.1 percent.

It is apparent from the foregoing that there has been provided a new and improved detector assembly which is particularly useful in detecting radiation which is utilized in connection with measuring characteristics of sheet material. By controlling the construction of the honeycomb, it is possible to make the detector assembly measurements relatively independent of sheet flutter. Although the invention has been primarily described in conjunction with the use of beta particles, the same principles can be utilized for other types of radiation as, for example, X-ray and infra-red radiation to eliminate the undesired radiation, i.e., radiation having an angle of incidence greater than a predetermined angle.

We claim:

1. In a detector assembly adapted to be disposed adjacent a sheet of material to determine a characteristic of the sheet of material by receiving radiation, including beta particles, which has passed through the sheet of material, a housing having a hole extending longitudinally therethrough a grid structure mounted in said housing in said hole and having passages therein with their longitudinal axes being generally parallel to the axis of the hole extending through said housing, said grid structure facing in a direction so that radiation passing through said sheet can pass through said grid structure, a scintillator disposed in said housing in said hole on the side of said grid structure opposite the side facing said sheet material and producing light pulses when struck by radiation passing through said grid structure, a light pipe disposed in said housing adjacent said scintillator for conveying said light pulses in said housing, a single photomultiplier tube disposed in said housing and receiving light pulses from said light pipe and converting said light pulses to electrical signals, a conductive metal layer encircling said photomultiplier tube, an insulating layer encircling the conductive metal layer, and a radiation permeable film impervious to ambient light pulses to which said photomultiplier tube is sensitive located substantially adjacent said scintillator between said scintillator and said grid structure, said grid structure being formed of a material having a density sufficiently high so that thin foils having a thickness ranging from 1 to 5 mils are capable of stopping or appreciably attenuating beta particles, the grid structure having a depth ranging from 10 to 5 times the maximum width of the passages in the grid structure, said grid structure serving to prevent or minimize reception of radiation having angles of incidence greater than 11° from the axes of the holes in the grid structure to thereby limit the angular field of view of the detector assembly so that sheet movements within the range of ½ inch can occur without changing the number of counts of light pulses detected by the photomultiplier tube by appreciably more than 0.1 per cent.

2. A detector assembly as in claim 1 wherein said light pipe is formed of quartz having a frustoconical configuration with first and second spaced apart parallel planar surfaces at opposite ends of the same and with an outer inclined wall, said outer inclined wall being covered with a reflecting material and wherein said first planar surface is the larger and faces said grid structure, and said second planar surface faces said photomultiplier tube.

3. A detector assembly as in claim 1 together with means covering said grid structure to prevent dust and corrosive fumes from entering said grid structure but permitting said radiation to pass through said grid structure.

4. A detector assembly as in claim 1 wherein said radiation permeable film consists of a plastic having a metal-like coating thereon.

* * * * *